United States Patent
Lee et al.

(10) Patent No.: US 11,599,866 B2
(45) Date of Patent: Mar. 7, 2023

(54) ELECTRONIC DEVICE FOR SELECTIVELY USING COILS SUPPORTING POWER SHARING

(71) Applicant: Samsung Electronics Co., Ltd., Suwon-si (KR)

(72) Inventors: Woosup Lee, Suwon-si (KR); Sungnam Kang, Suwon-si (KR); Jungsik Park, Suwon-si (KR); Jungoh Sung, Suwon-si (KR); Duhoon Jung, Suwon-si (KR); Sooung Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 352 days.

(21) Appl. No.: 17/022,595

(22) Filed: Sep. 16, 2020

(65) Prior Publication Data

US 2021/0090055 A1   Mar. 25, 2021

(30) Foreign Application Priority Data

Sep. 24, 2019 (KR) .......................... 10-2019-0117308

(51) Int. Cl.
| | |
|---|---|
| *H04B 5/00* | (2006.01) |
| *G06F 1/28* | (2006.01) |
| *G06Q 20/20* | (2012.01) |
| *G06Q 30/00* | (2012.01) |
| *G06Q 20/32* | (2012.01) |
| *G06Q 20/34* | (2012.01) |

(Continued)

(52) U.S. Cl.
CPC ............. *G06Q 20/204* (2013.01); *G06F 1/28* (2013.01); *G06Q 20/208* (2013.01);
(Continued)

(58) Field of Classification Search
CPC .............. G06Q 20/204; G06Q 20/208; G06Q 20/3226; G06Q 20/3278; G06Q 20/347;
(Continued)

(56) References Cited

U.S. PATENT DOCUMENTS 10,680,322 B2   6/2020 Lee et al.
11,222,330 B2 *  1/2022 Dua ..................... G06Q 20/327
(Continued)

FOREIGN PATENT DOCUMENTS

AU   2016209748 A1   8/2017
KR   10-2016-0057278 A   5/2016
(Continued)

OTHER PUBLICATIONS

International Search Report dated Jan. 4, 2021, issued in International Application No. PCT/KR2020/012408.

*Primary Examiner* — Stacy Whitmore
(74) *Attorney, Agent, or Firm* — Jefferson IP Law, LLP

(57) ABSTRACT

An electronic device for supporting power sharing and data communication with an external electronic device, and a method therefor are provided. The electronic device includes a power management circuit, an antenna including a first coil and a second coil, a transceiver circuit configured to transmit a power signal received from the power management circuit to the antenna and to transmit a power signal received from the antenna to the power management circuit, the transceiver circuit including a first transceiver terminal and a second transceiver terminal, a first switch, and a control circuit electrically connected to the first switch and the transceiver circuit. A first end of the second coil may be connected to the first transceiver terminal. A second end of the second coil may be connected to the second transceiver terminal. A first end of the first coil may be connected to the first transceiver terminal through the first switch. A second end of the first coil may be connected to the second transceiver terminal. The control circuit may be configured to control the first switch based on identification information of an external electronic device received from the antenna through the transceiver circuit.

20 Claims, 14 Drawing Sheets

(51) Int. Cl.
  *G06Q 20/40* (2012.01)
  *G06Q 30/018* (2023.01)
(52) U.S. Cl.
  CPC ..... *G06Q 20/3226* (2013.01); *G06Q 20/3278* (2013.01); *G06Q 20/347* (2013.01); *G06Q 20/352* (2013.01); *G06Q 20/40* (2013.01); *G06Q 30/0185* (2013.01); *H04B 5/0037* (2013.01); *H04B 5/0081* (2013.01)
(58) Field of Classification Search
  CPC .. G06Q 20/352; G06Q 20/40; G06Q 30/0185; G06Q 20/322; G06F 1/28; G06F 1/1698; H04B 5/0037; H04B 5/0081; H02J 50/10
  See application file for complete search history.

(56) References Cited

U.S. PATENT DOCUMENTS

| | | | |
|---|---|---|---|
| 2005/0017673 A1* | 1/2005 | Tsukamoto | H02J 50/10 320/106 |
| 2014/0117760 A1 | 5/2014 | Baarman et al. | |
| 2014/0302819 A1* | 10/2014 | McKelvey | H04W 4/023 455/26.1 |
| 2015/0091502 A1 | 4/2015 | Mukherjee et al. | |
| 2016/0006291 A1 | 1/2016 | Li et al. | |
| 2016/0099604 A1 | 4/2016 | Von Novak, III et al. | |
| 2016/0127011 A1 | 5/2016 | Phillips et al. | |
| 2016/0345125 A1 | 11/2016 | Kim et al. | |
| 2017/0324450 A1 | 11/2017 | Lee et al. | |
| 2018/0137971 A1 | 5/2018 | Jang | |
| 2018/0323828 A1 | 11/2018 | Hwang et al. | |
| 2019/0109494 A1* | 4/2019 | Lee | H02J 50/12 |
| 2021/0406856 A1* | 12/2021 | Fisher | H04M 1/72412 |
| 2022/0019298 A1* | 1/2022 | Kim | G06F 3/03545 |

FOREIGN PATENT DOCUMENTS

| | | |
|---|---|---|
| KR | 10-1810001 B1 | 12/2017 |
| WO | 2016/117955 A1 | 7/2016 |
| WO | 2017/086628 A1 | 5/2017 |
| WO | WO-2018216063 A1 * | 11/2018 |

\* cited by examiner

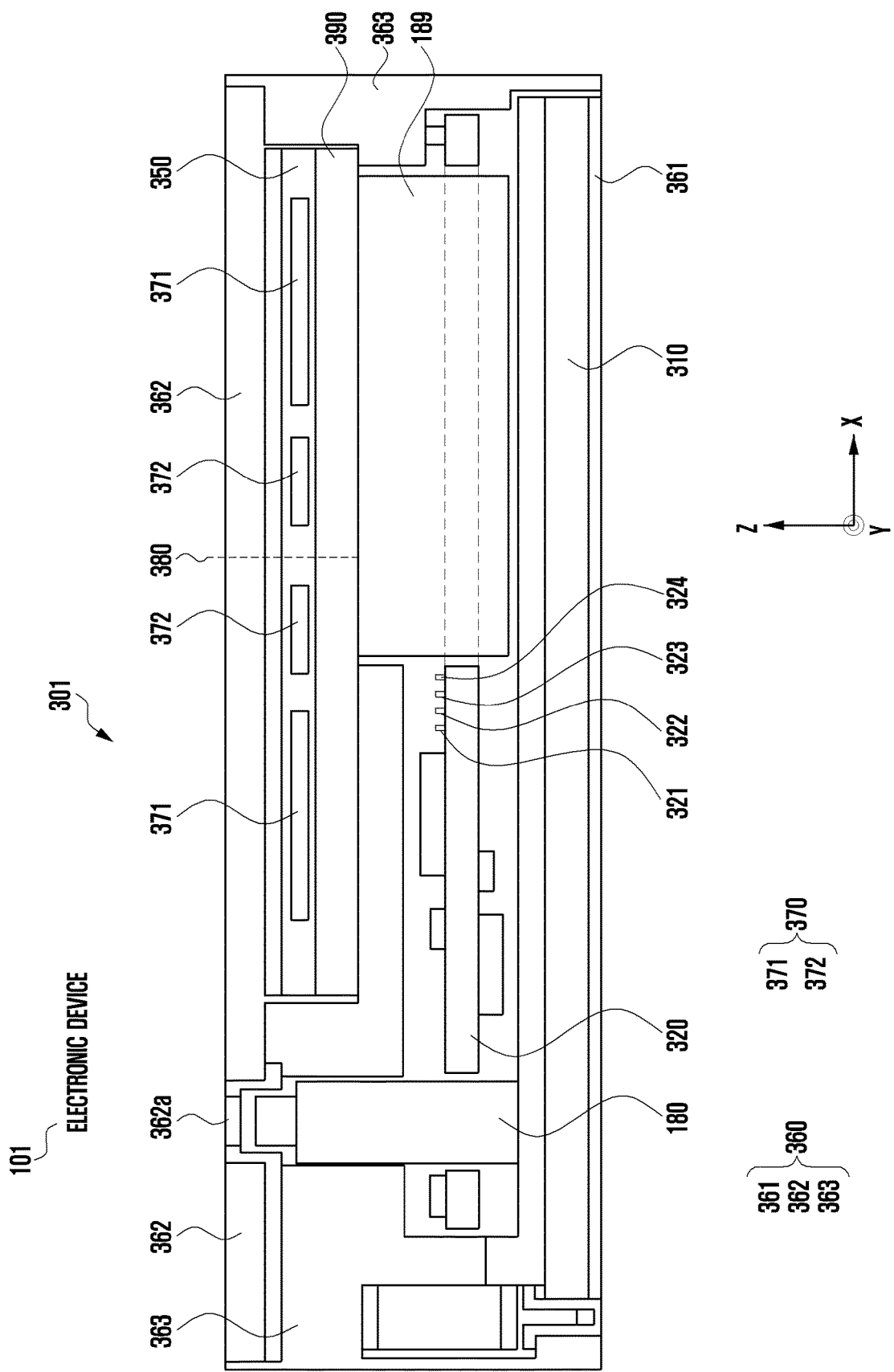

ELECTRONIC DEVICE FOR SELECTIVELY USING COILS SUPPORTING POWER SHARING

CROSS-REFERENCE TO RELATED APPLICATION(S)

This application is based on and claims priority under 35 U.S.C. § 119 of a Korean patent application number 10-2019-0117308 filed on Sep. 24, 2019, in the Korean Intellectual Property Office, the disclosure of which is incorporated by reference herein in its entirety.

BACKGROUND

1. Field

The disclosure relates to an electronic device supporting power sharing and data communication with an external electronic device.

2. Description of Related Art

A wireless charging technology capable of charging a battery of an electronic device even without connecting to a wired charger has been applied to various electronic devices. For example, battery charging can be performed even by putting an electronic device, such as a smart phone or a wearable device, on a charging pad or a charging cradle. Further, power sharing is possible between electronic devices.

The above information is presented as background information only to assist with an understanding of the disclosure. No determination has been made, and no assertion is made, as to whether any of the above might be applicable as prior art with regard to the disclosure.

SUMMARY

Electronic coupling between transmission/reception coils is closely related to a power transfer efficiency. For example, if the size (e.g., outer diameter) of a coil for transmitting the power is different from the size of a coil for receiving the power, the numerical value (e.g., coupling coefficient) indicating the degree of the coupling may be lowered, and as a result, the power transfer efficiency may become lower than expected.

Aspects of the disclosure are to address at least the above-mentioned problems and/or disadvantages and to provide at least the advantages described below. Accordingly, an aspect of the disclosure is to provide an electronic device supporting power sharing and data communication with an external electronic device.

Additional aspects will be set forth in part in the description which follows and, in part, will be apparent from the description, or may be learned by practice of the presented embodiments.

According to various embodiments, an electronic device may be configured to efficiently transmit/receive the power with an external device having coils with various sizes.

According to various embodiments, an electronic device may be configured to transmit a payment signal using coils for transmitting/receiving the power.

In accordance with an aspect of the disclosure, an electronic device is provided. The electronic device includes a power management circuit, an antenna including a first coil and a second coil, a transceiver circuit configured to transmit a power signal received from the power management circuit to the antenna and to transmit a power signal received from the antenna to the power management circuit, the transceiver circuit including a first transceiver terminal and a second transceiver terminal, a first switch, and a control circuit electrically connected to the first switch and the transceiver circuit. A first end of the second coil may be connected to the first transceiver terminal. A second end of the second coil may be connected to the second transceiver terminal. A first end of the first coil may be connected to the first transceiver terminal through the first switch. A second end of the first coil may be connected to the second transceiver terminal. The control circuit may be configured to control the first switch based on identification information of an external electronic device received from the antenna through the transceiver circuit.

The electronic device may further include a second switch and a third switch, wherein the second end of the first coil may be connected to the second transceiver terminal through the second switch, wherein the second end of the first coil may be connected to the first end of the second coil through the third switch, and wherein the control circuit may be further configured to open the second switch, close the first switch and the third switch, and transmit a payment signal to the antenna through the transceiver circuit based on a user authentication for payment.

According to various embodiments, the electronic device can efficiently perform power sharing with various kinds of external electronic devices by connecting the first coil and the second coil in parallel to the transceiver circuit or connecting only the second coil to the transceiver circuit based on the identification of the external electronic devices. The electronic device can improve a recognition rate of the payment by connecting the first coil and the second coil in series to the transceiver circuit so that a strong magnetic field is formed around the electronic device and transmitting the payment signal in such a state.

Effects that can be obtained in the disclosure are not limited to the above-described effects, and other unmentioned effects can be clearly understood by those of ordinary skill in the art to which the disclosure pertains from the following description.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following detailed description, taken in conjunction with the accompanying drawings, in which:

FIG. 3A is a schematic cross-sectional view of an electronic device according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
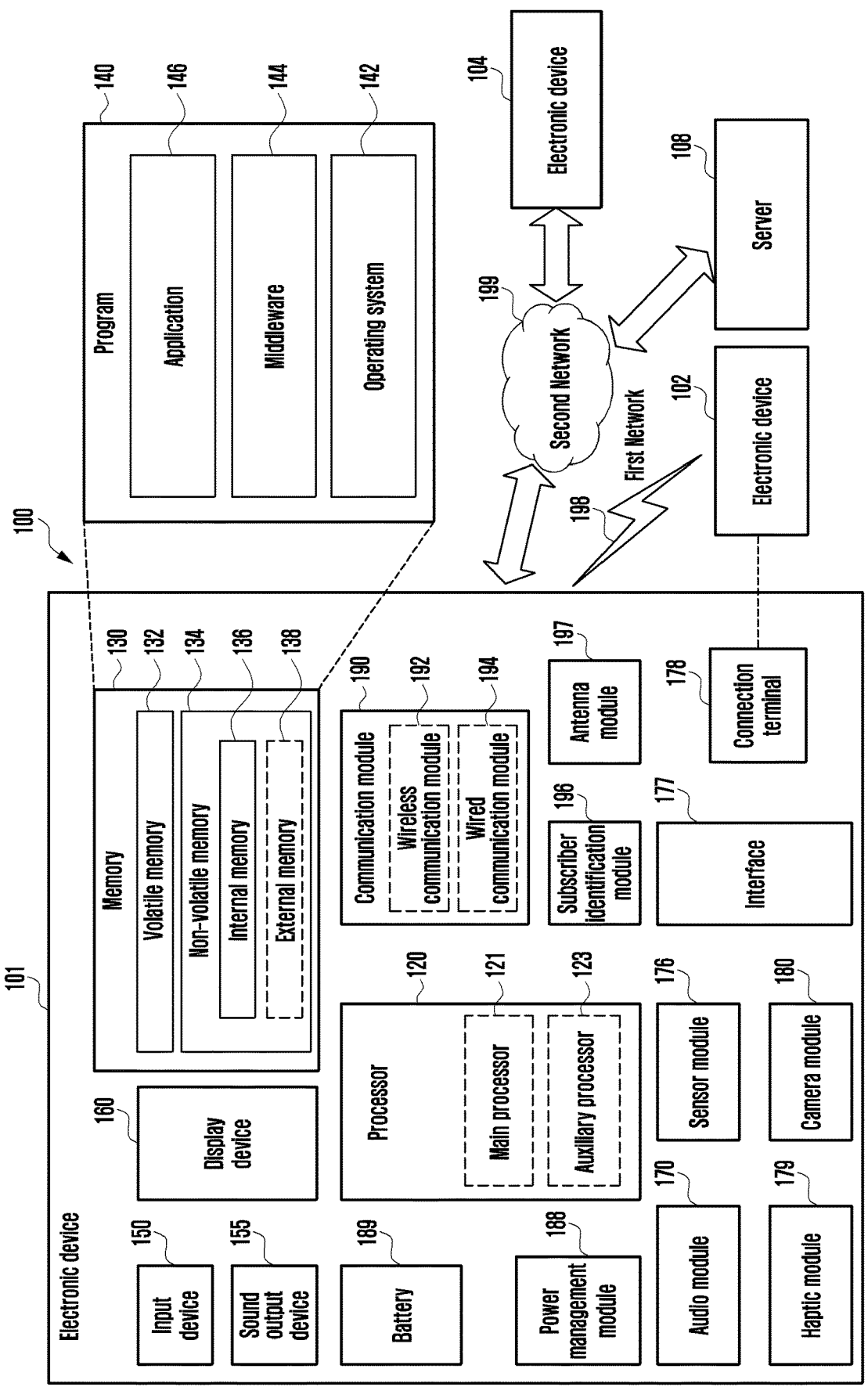
FIG. 1 is a block diagram of an electronic device in a network environment according to an embodiment of the disclosure.

FIG. 1 is a block diagram illustrating an electronic device 101 in a network environment 100 according to an embodiment of the disclosure. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) there between via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
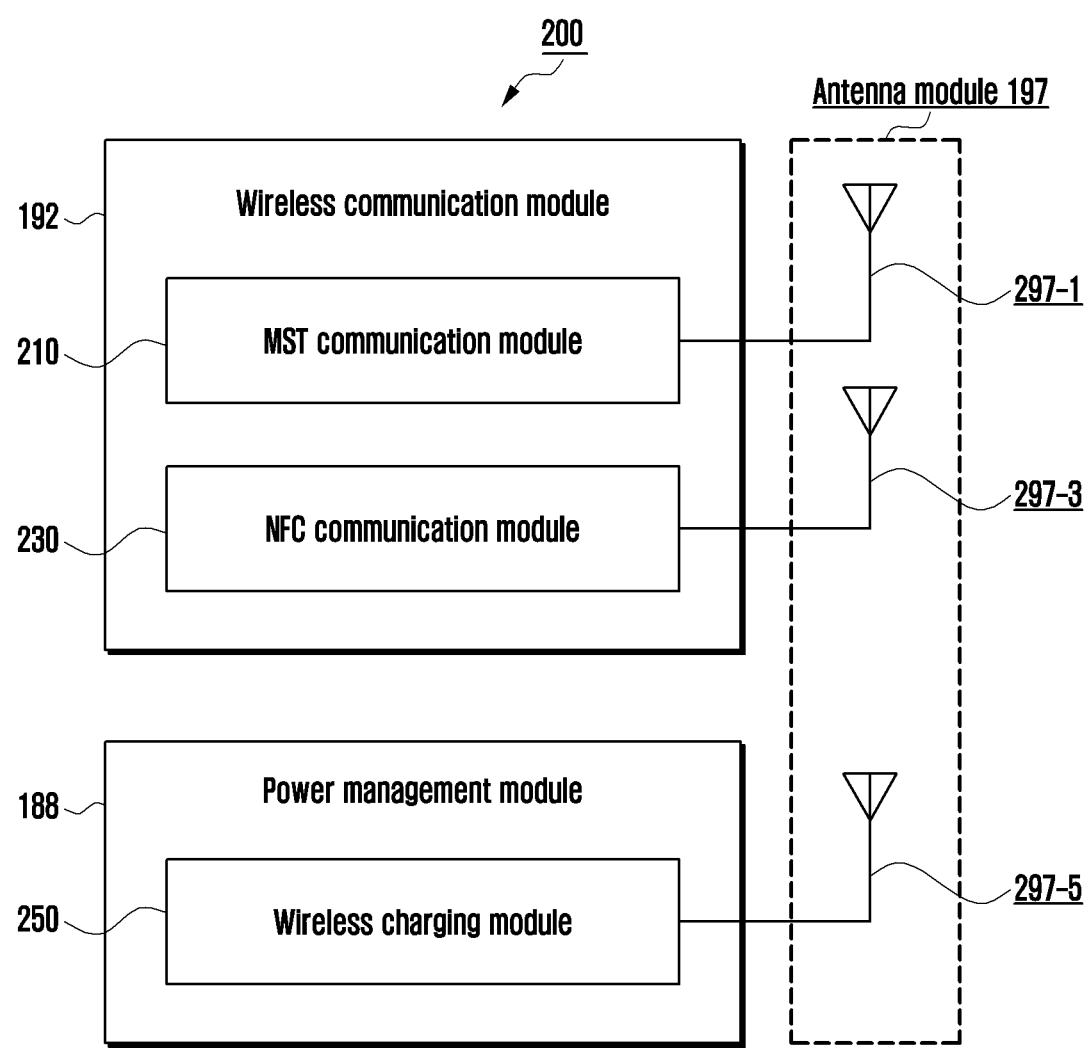
FIG. 2 is a block diagram of a wireless communication module, a power management module, and an antenna module of an electronic device according to an embodiment of the disclosure.

FIG. 2 is a block diagram 200 illustrating the wireless communication module 192, the power management module 188, and the antenna module 197 of the electronic device 101 according to various embodiments. Referring to FIG. 2, the wireless communication module 192 may include a magnetic secure transmission (MST) communication module 210 or a near-field communication (NFC) module 230, and the power management module 188 may include a wireless charging module 250. In such a case, the antenna module 197 may include a plurality of antennas that include a MST antenna 297-1 connected with the MST communication module 210, a NFC antenna 297-3 connected with the NFC communication module 230, and a wireless charging antenna 297-5 connected with the wireless charging module 250. In some embodiments, the MST communication module 210, the NFC communication module 230, and the wireless charging module 250 may be configured as one module. For ease of description, the same components as those described in regard to FIG. 1 are briefly described or omitted from the description.

The MST communication module 210 may receive a signal containing control information or payment information such as card information from the processor 120, generate a magnetic signal corresponding to the received signal, and then transfer the generated magnetic signal to the external electronic device 102 (e.g., a point-of-sale (POS) device) via the MST antenna 297-1. To generate the magnetic signal, according to an embodiment, the MST communication module 210 may include a switching module (not shown) that includes one or more switches connected with the MST antenna 297-1, and control the switching module to change the direction of voltage or current supplied to the MST antenna 297-1 according to the received signal. The change of the direction of the voltage or current allows the direction of the magnetic signal (e.g., a magnetic field) emitted from the MST antenna 297-1 to change accordingly. If detected at the external electronic device 102, the magnetic signal with its direction changing may cause an effect (e.g., a waveform) similar to that of a magnetic field that is generated when a magnetic card corresponding to the card information associated with the received signal is swiped through a card reader of the electronic device 102. According to an embodiment, for example, payment-related information and a control signal that are received by the electronic device 102 in the form of the magnetic signal may be further transmitted to an external server 108 (e.g., a payment server) via the network 199.

The NFC communication module 230 may obtain a signal containing control information or payment information such as card information from the processor 120 and transmit the obtained signal to the external electronic device 102 via the NFC antenna 297-3. According to an embodiment, the NFC communication module 230 may receive such a signal transmitted from the external electronic device 102 via the NFC antenna 297-3.

The wireless charging module 250 may wirelessly transmit power to the external electronic device 102 (e.g., a cellular phone or wearable device) via the wireless charging antenna 297-5, or wirelessly receive power from the external electronic device 102 (e.g., a wireless charging device). The wireless charging module 250 may support one or more of various wireless charging schemes including, for example, a magnetic resonance scheme or a magnetic induction scheme.

According to an embodiment, some of the MST antenna 297-1, the NFC antenna 297-3, or the wireless charging antenna 297-5 may share at least part of their radiators. For example, the radiator of the MST antenna 297-1 may be used as the radiator of the NFC antenna 297-3 or the wireless charging antenna 297-5, or vice versa. In such a case, the antenna module 197 may include a switching circuit (not shown) adapted to selectively connect (e.g., close) or disconnect (e.g. open) at least part of the antennas 297-1, 297-3, or 297-5, for example, under the control of the wireless communication module 192 (e.g., the MST communication module 210 or the NFC communication module 230) or the power management module (e.g., the wireless charging module 250). For example, when the electronic device 101 uses a wireless charging function, the NFC communication module 230 or the wireless charging module 250 may control the switching circuit to temporarily disconnect at least one portion of the radiators shared by the NFC antenna 297-3 and the wireless charging antenna 297-5 from the NFC antenna 297-3 and to connect the at least one portion of the radiators with the wireless charging antenna 297-5.

According to an embodiment, at least one function of the MST communication module 210, the NFC communication module 230, or the wireless charging module 250 may be controlled by an external processor (e.g., the processor 120). According to an embodiment, at least one specified function (e.g., a payment function) of the MST communication module 210 or the NFC communication module 230 may be performed in a trusted execution environment (TEE). According to an embodiment, the TEE may form an execution environment in which, for example, at least some designated area of the memory 130 is allocated to be used for performing a function (e.g., a financial transaction or personal information-related function) that requires a relatively high level of security. In such a case, access to the at least some designated area of the memory 130 may be restrictively permitted, for example, according to an entity accessing thereto or an application being executed in the TEE.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3B:
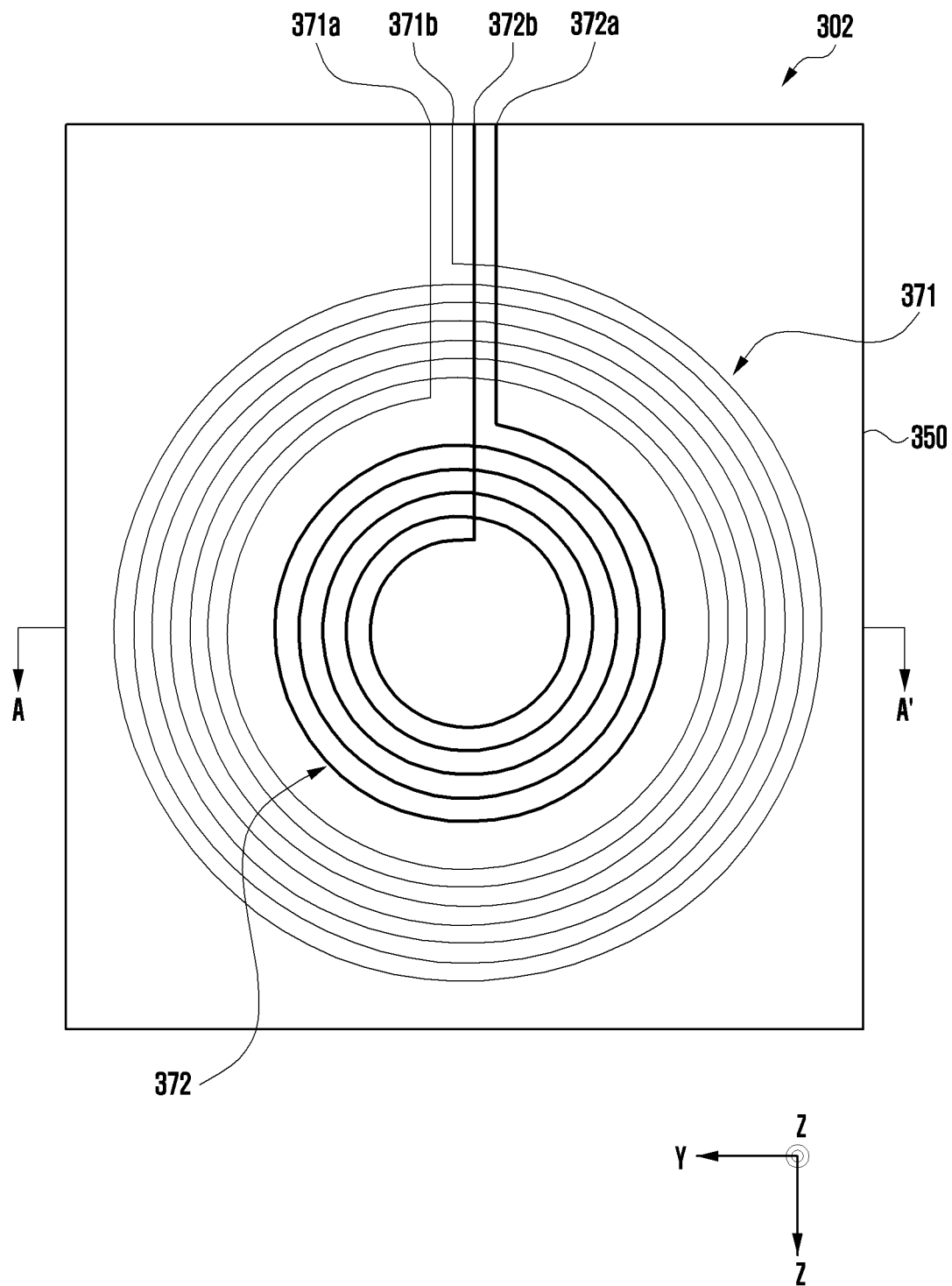
FIG. 3B is a view illustrating a front side of an antenna illustrated in FIG. 3A according to an embodiment of the disclosure.
Figure 3C:
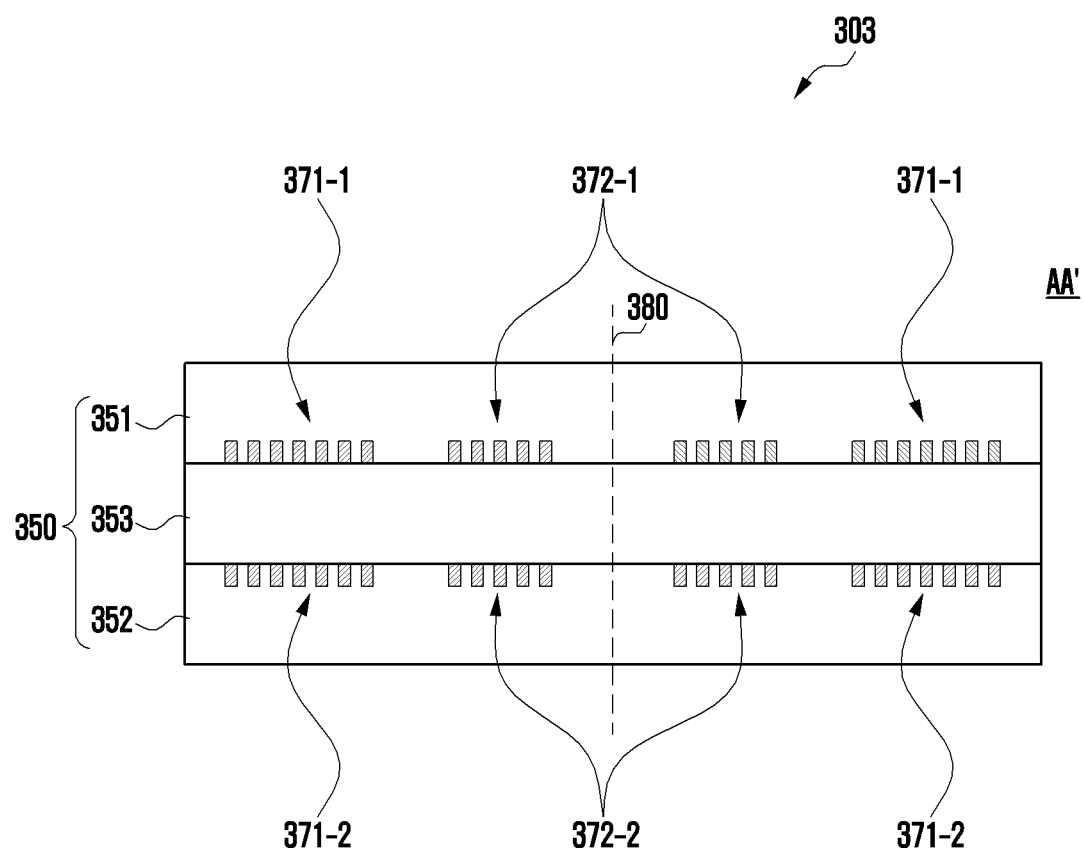
FIG. 3C is a view taken in AA' direction of an antenna illustrated in FIG. 3B according to an embodiment of the disclosure.

FIG. 3A is a schematic cross-sectional view 301 of an electronic device 101 according to various embodiments of the disclosure, FIG. 3B is a view 302 illustrating a front side of an antenna 370 illustrated in FIG. 3A, and FIG. 3C is a view 303 taken in AA' direction of an antenna 370 illustrated in FIG. 3B. Referring to FIGS. 3A and 3B, an electronic device 101 may include a camera module 180, a battery 189, a display 310 (e.g., display device 160 of FIG. 1), a board 320, or a flexible printed circuit board (FPCB) 350. The camera module 180, the battery 189, the display 310 (e.g., display device 160 of FIG. 1), the board 320, or the FPCB 350 may be located inside a housing 360 of the electronic device 101. The housing 360 may include a first cover (or front cover) (e.g., glass) 361 directed towards a first direction and forming a first surface (or front surface) of the electronic device 101, a second cover (or rear cover) 362 directed towards a second direction being opposite to the first direction and forming a second surface (or rear surface) of the electronic device 101, and a side member 363 surrounding a space between the first cover 361 and the second cover 362. For convenience in explanation, constituent elements overlapping those of FIG. 1 will be omitted or will be simply described.

The display 310, as seen on the first cover 361 to face the first surface, may be located below the first cover 361 (e.g., may be attached to the first cover 361). According to an embodiment, the display 310 may be formed integrally with a touch sensor or a pressure sensor. According to an embodiment, a biometric sensor (e.g., fingerprint sensor) may be deployed inside or on one side surface of the display 310. According to an embodiment, the touch sensor or the pressure sensor may be separated from the display 310. For example, the touch sensor may be located between the first cover 361 and the display 310. According to an embodiment, the first cover 361 and the display 310 may be integrally configured into one.

Modules, such as a processor (e.g., processor 120 of FIG. 1), a power management module (e.g., power management module 188 of FIG. 1), or a communication module (e.g., communication module 190 of FIG. 1), may be deployed on at least one surface (e.g., a surface facing the display 310 and/or a surface facing the FPCB 350) of the board 320. The board 320 may be implemented using various types of boards (e.g., at least one of a printed circuit board (PCB) or a flexible printed circuit board (FPCB)).

The second cover 362 may be divided into a conductive region composed of a conductive material and a non-conductive region composed of a non-conductive material. For example, on the second cover 362, a part facing the antenna 370 may be composed of a non-conductive material so as not to shield a magnetic signal generated from the antenna 370, and the remaining part may be composed of a conductive material. According to an embodiment, on the second cover 362, one or more openings 362a may be formed to expose parts (e.g., camera module 180, flash, or fingerprint sensor) of the electronic device 101 to outside.

As seen on the second cover 362 to face the second surface, the FPCB 350 may be located below the second cover 362 (e.g., may be attached to one side surface of the second cover 362). The FPCB 350 may include at least one antenna 370. The antenna 370 may be electrically insulated from the conductive region of the second cover 362.

Figure 3C:
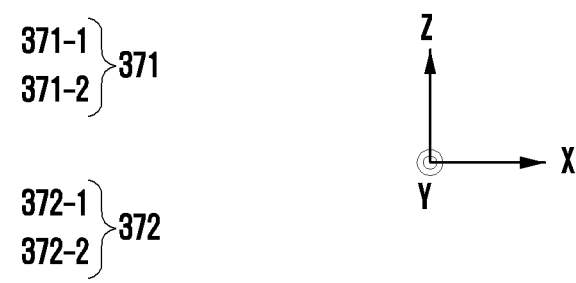

The antenna 370 (e.g., MST antenna 297-1 of FIG. 2 and/or wireless charging antenna 297-5) may include a first coil 371 and a second coil 372. According to an embodiment, the first coil 371 may be a flat type (or spiral type) coil having an axis 380 substantially in parallel to a first direction (or second direction) and spirally wound in one direction on an XY plane (e.g., XY plane of FIG. 3) around the axis 380. As seen to face the second surface, the second coil 372 may be a flat type coil located inside the first coil 372 and having substantially the same axis as the axis 380. One end (or first end) 371a and the other end (or second end) 371b of the first coil 371 may be electrically connected (e.g., may be connected through a separate FPCB) to a first pad 321 and a second pad 322 formed on the board 320, respectively, and may be electrically connected to a part (e.g., MST communication module 210 or wireless charging module 250 of FIG. 2) mounted on the board 320 through the first pad 321 and the second pad 322. One end (or first end) 372a and the other end (or second end) 372b of the second coil 372 may be electrically connected to a third pad 323 and a fourth pad 324 formed on the board 320, respectively, and may be electrically connected to a part (e.g., MST communication module 210 or wireless charging module 250 of FIG. 2) mounted on the board 320 through the third pad 323 and the fourth pad 324.

According to an embodiment, in addition to the first coil 371 and the second coil 372, a third coil (not illustrated) may be additionally deployed inside the first coil 371. In the disclosure, the coils are not limited to the two coils, but other coils may be additionally deployed, and the coils, such as the first coil 371, the second coil 372, and the third coil, may be selectively used depending on specific conditions. For example, the coils may be selectively used in accordance with the kind of network having radio frequency (RF) characteristics in addition to the MST and the NFC, an application being executed in the electronic device 101, or a user input.

The first coil 371 may be configured so that the physical characteristic of the first coil 371 satisfies the standard required in International Standards related to wireless charging. According to an embodiment, the first coil 371 may be designed to have a specific outer diameter. For example, the first coil 371 may be designed to have an outer diameter (e.g., about 42 to 44Φ) satisfying the International Standards (e.g., Qi standards) for wireless power transmission. The International Standards for the wireless power transmission may include the standards, such as power matters alliance (PMA), in addition to the QI standards, and the disclosure is not limited to a specific standard, but may be designed to be customized with a specific purpose or for a specific purpose.

The second coil 372 is located inside the first coil 371 and may be designed to have an outer diameter different from the outer diameter of the first coil 371. For example, the second coil 372 may be designed to have substantially the same outer diameter as the outer diameter (e.g., about 21 to 23Φ) of a wireless charging coil mounted on a specific product (e.g., electronic watch).

The first coil 371 and the second coil 372 may be configured to be connected in parallel to the wireless charging circuit (e.g., wireless charging module 250 of FIG. 2) as a circuit. For the parallel connection, the antenna 370 may be designed so that the electrical characteristic of the antenna 370 satisfies the standard required in International Standards. According to an embodiment, in a state where the first coil 371 and the second coil 372 are configured as a parallel circuit, the antenna 370 may be designed so that the total sum of inductances induced from the antenna 370 has the inductance required in the Wireless Power Consortium (WPC) standards. For example, in order for the total sum of the induced inductances to satisfy the WPC standards, the first coil 371 and the second coil 372 may be designed so that the inductance of the first coil 371 is higher than the inductance of the second coil 372. For example, if a value required in the WPC standards is about 8 to 10 uH, the first coil 371 may be optimized to have about 18 to 23 uH, and the second coil 372 may be optimized to have about 13 to 18 uH.

According to an embodiment, the first coil 371 and the second coil 372 may be configured to be connected in series to the wireless charging circuit as a circuit. In case of the serial connection, the total sum of the inductances induced from the antenna 370 may be highest. For example, in case that the first coil 371 is optimized to have about 18 to 23 uH, and the second coil 372 is optimized to have about 13 to 18 uH, the total sum of the inductances in accordance with the parallel connection of the first coil 371 and the second coil 372 may be about 8 to 10 uH, and the total sum of the inductances in accordance with the series connection thereof may be about 36 uH. In case that the first coil 371 and the second coil 372 are connected in series, a stronger magnetic field may be formed around the electronic device 101 in comparison with the parallel connection thereof. The strength of the magnetic field may be one of important factors to increase a recognition distance of the wireless communication. For example, in case of the series connection, the antenna 370 may be used as an antenna (e.g., MST antenna 297-1 of FIG. 2) for transmitting a payment signal further as long as an increased distance.

The FPCB 350 may be composed of a plurality of layers, and one portion of the coil may be formed on one of the layers whereas the other portion of the coil may be formed on another of the layers. Referring to FIG. 3C, the FPCB 350 may include a first layer 351 on which a conductive pattern is formed, a second layer 352 on which a conductive pattern is formed, and a middle layer 353 located between the layers 351 and 352. The first coil 371 may include a (1-1)-th coil 371-1 wound in one direction on the first layer 351 around the axis 380, and a (1-2)-th coil 371-2 wound in the same direction on the second layer 352 around substantially the same axis. The second coil 372 may include a (2-1)-th coil 372-1 wound in the same direction as the direction in which the (1-1)-th coil 371-1 is wound on the first layer 351 around substantially the same axis as the axis 380, and a (2-2)-th coil 372-2 wound in the same direction on the second layer 352 around substantially the same axis 380. Although not illustrated, the middle layer 353 may include a first connection part connecting one of two ends of the (1-1)-th coil 371-1 and one of two ends of the (1-2)-th coil 372-2 (e.g., conductive via connecting the two ends), and a second connection part connecting one of two ends of the (2-1)-th coil 372-1 and one of two ends of the (2-2)-th coil 372-2. The first connection part or the second connection part may include a conductive via filling a hole formed to penetrate at least a part of the first layer or the second layer. Through the first connection part or the second connection part, the above-described coils may extend to be connected to each other. The other end of the (1-1)-th coil 371-1 may be one of one end 371a and the other end 371b of the first coil 371. The other end of the (1-2)-th coil 371-2 may be the other of one end 371a and the other end 371b of the first coil 371. The other end of the (2-1)-th coil 372-1 may be one of one end 372a and the other end 372b of the second coil 372. The other end of the (2-2)-th coil 372-2 may be the other of one end 372a and the other end 372b of the second coil 372.

A shielding layer 390 (e.g., magnetic sheet and/or graphite sheet) for preventing a signal (e.g., power signal) being transmitted/received through the antenna 370 from exerting an influence on parts located below the FPCB 350 and for concentrating and transmitting a signal (e.g., power signal or payment signal) being transmitted from the antenna 370 in a specific direction (e.g., second direction, output direction to an outside of the electronic device) may be located between the FPCB 350 and the board 320 (e.g., may be attached to the FPCB 350).

Figure 4:
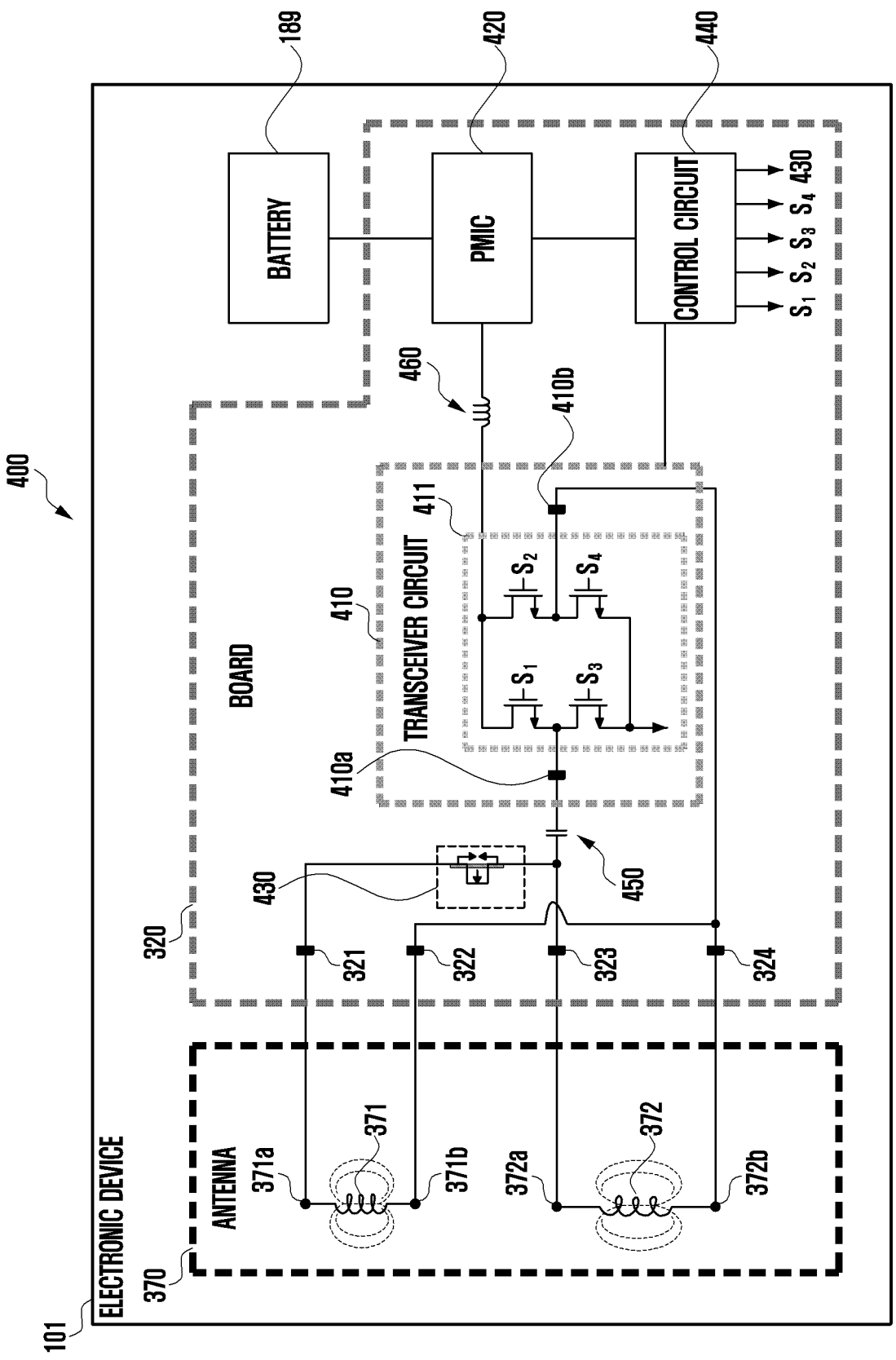
FIG. 4 is a block diagram of an electronic device configured to transmit and receive a power signal using an antenna according to an embodiment of the disclosure.

FIG. 4 is a block diagram 400 of an electronic device 101 configured to transmit and receive a power signal using an antenna 370 according to an embodiment of the disclosure. Referring to FIG. 4, an electronic device 101 may include a battery 189, a board 320, an antenna 370, a transceiver circuit 410, a power management integrated circuit (PMIC) 420, a first switch 430, or a control circuit 440. At least one of the transceiver circuit 410, the PMIC 420, the first switch 430, or the control circuit 440 may be mounted on the board 320. In a certain embodiment, the transceiver circuit 410 may be a module configured inside a wireless charging circuit (e.g., wireless charging module 250 of FIG. 2). For convenience in explanation, constituent elements overlapping those of FIG. 3 will be omitted or will be simply described.

The transceiver circuit 410 (e.g., wireless charging module 250 of FIG. 2) may be configured to transmit a power signal received from the PMIC 420 to the antenna 370 and to transmit a power signal received from the antenna 370 to the PMIC 420. According to an embodiment, the transceiver circuit 410 may include a full bridge circuit 411.

The full bridge circuit 411 may be configured to operate as an inverter in case that the electronic device 101 is configured to transmit the power (hereinafter, power transmission mode). The full bridge circuit 411 may be configured to operate as a rectifier in case that the electronic device 101 is configured to receive the power (hereinafter, power reception mode).

According to an embodiment of the disclosure, the full bridge circuit 411 may include four switches S1, S2, S3, and S4. One end of S1 and one end of S2 may be connected to the PMIC 420. One end of S3 and one end of S4 may be connected to the other end of S1 and the other end of S2, respectively. The other end of S3 and the other end of S4 may be connected to ground (e.g., ground formed on the board 320). The other end of S1 and one end of S3 may be connected to a first transceiver terminal 410a for transmitting or receiving the power signal. The other end of S2 and one end of S4 may be connected to a second transceiver terminal 410b for transmitting or receiving the power signal.

According to an embodiment, the control circuit 440 may control the state of the plurality of switches (e.g., S1, S2, S3, and S4) in accordance with a power mode. For example, in case that S1 and S4 are in a close state (or ON state), S2 and S3 may be in an open state (or OFF state) on the contrary (hereinafter, first transmission state). In case that S1 and S4 are in an open state, S2 and S3 may be in a close state (hereinafter, second transmission state). The transceiver circuit 410 may transmit the power signal to the antenna 370 through the transceiver terminals 410a and 410b by periodically repeating the first transmission state and the second transmission state in accordance with the wireless charging standard (e.g., to match a designated frequency so as to be used for the wireless charging in the wireless power consortium (WPC) or alliance for wireless power (A4WP)).

According to an embodiment, in a reception mode in which the transceiver circuit 410 can receive the poser from outside, switches inside the transceiver circuit 410 may be differently controlled. For example, S1 and S2 may be configured to be in a close state, and S3 and S4 may be configured to be in an open state (hereinafter, reception state). The transceiver circuit 410 may rectify and supply the power signal being received from the antenna 370 through the transceiver terminals 410a and 410b to the PMIC 420 by maintaining the reception state.

In a close state, the first switch 430 may connect the first coil 371 to the transceiver circuit 410. In an open state, the first switch 430 may disconnect the first coil 371 and the transceiver circuit 410 from each other. According to an embodiment, the first end 371a of the first coil 371 may be connected to the first transceiver terminal 410a through the first switch 430, and the second end 371b may be connected to the second transceiver terminal 410b. The first terminal 372a of the second coil 372 may be connected to the first transceiver terminal 410a, and the second terminal 372b may be connected to the second transceiver terminal 410b. According to the connection configuration as described above, in case that the first switch 430 is in a close state, the first coil 371 may be connected in parallel to the transceiver circuit 410 together with the second coil 372, and thus may be used as an antenna (e.g., wireless charging antenna 297-5) for power sharing (e.g., power transmission or reception) together with the second coil 372. In case that the first switch 430 is in an open state, only the second coil 372 may be used as the antenna for the power sharing. According to an embodiment, the first end 371a of the first coil 371 and the first transceiver terminal 410a may be connected to each other without the first switch 430, and the first switch 430 may not be located between the first end 371a and the first transceiver terminal 410a, but may be located between the second end 371b and the second transceiver terminal 410b.

According to an embodiment, in a power transmission mode, the control circuit 440 may control the full bridge circuit 411 to periodically repeat the first transmission state and the second transmission state. Accordingly, the power of the battery 189 may be supplied to an external electronic device (e.g., electronic device 102 of FIG. 1) through the antenna 370. In a power reception mode, the control circuit 440 may control the full bridge circuit 411 to maintain the reception state. Accordingly, the power received from the external electronic device through the antenna 370 may be supplied to the battery 189.

The control circuit 440 may control the first switch 430 based on the kind of the external electronic device that is a target to share the power (e.g., wireless charging pad, wireless charging cradle, electronic watch, or a device (e.g., smart phone) that is the same kind as the electronic device 101. According to an embodiment, the control circuit 440 may control the first switch 430 using a communication method (e.g., inband method) using the transceiver circuit 410. The inband method may include, for example, a technology to increase spectrum effects by performing data transmission/reception in the same frequency band. For example, the external electronic device may include data in the power signal to be transmitted by modulating the frequency or amplitude of the power signal. The transceiver circuit 410 may acquire the data from the power signal received from the external electronic device through the antenna 370, and may transfer the acquired data to the control circuit 440. The control circuit 440 may acquire identification information (e.g., identification (ID) configuration data, manufacturer information, device identifier, or version information) from the received data. The control circuit 440 may open or close the first switch 430 based on the identification information. For example, the control circuit 440 may operate to acquire information on the external device based on the acquired identification information, to control the switch corresponding to the external device, and to configure an optimized circuit using the first coil 371 or the second coil 372 based on the controlled switch. For example, if the external electronic device is identified as a first external electronic device, the control circuit 440 may close the first switch 430. For example, the first external electronic device may be a product of a designated manufacturer (e.g., Samsung smart phone), a device having a wireless charging coil having substantially the same outer diameter as the outer diameter of the first coil 371, or a device having received Qi certification defined in the WPC. If the external electronic device is identified as a second external electronic device, the control circuit 440 may open the first switch 430. The second external electronic device may be, for example, an electronic watch or a device having substantially the same outer diameter as the outer diameter of the second coil 372. According to an embodiment, the control circuit 440 may control the first switch 430 using another communication method (e.g., outband method). For example, the control circuit 440 may acquire the identification information using any one of various short-range communication methods, such as Bluetooth, Bluetooth low energy (BLE), Wi-Fi, and near field communication (NFC).

The electronic device 101 may further include a matching circuit 450 to minimize a return loss of the power signal. For example, the matching circuit may be inserted into a transmission line to prevent a signal loss that may occur in case that a receiver in which the signal is generated and other switches existing in the middle operate as loads. Accordingly, the transmission line may match a specific impedance. The matching circuit 450 may be located between the antenna 370 and the transceiver circuit 410. For example, the matching circuit 450 may be configured using a lumped element and/or a distributed element. In a low frequency band, a matching circuit network using the lumped element may be configured, and the lumped element used in this case may include at least one of a register, an inductor, or a capacitor. The matching circuit 450 may further include a strip line as a distributed element. The matching circuit is not limited to the circuit type illustrated in the drawing, but may be configured in various types, such as an L type, PI type, and T type.

The electronic device 101 may further include a prevention circuit 460 for preventing a damage of the PMIC 420 due to abrupt current and/or voltage changes. The prevention circuit 460 may be located on a power line between the transceiver circuit 410 and the PMIC 420. For example, the prevention circuit 460 may include an inductor and/or capacitor.

Figure 5:
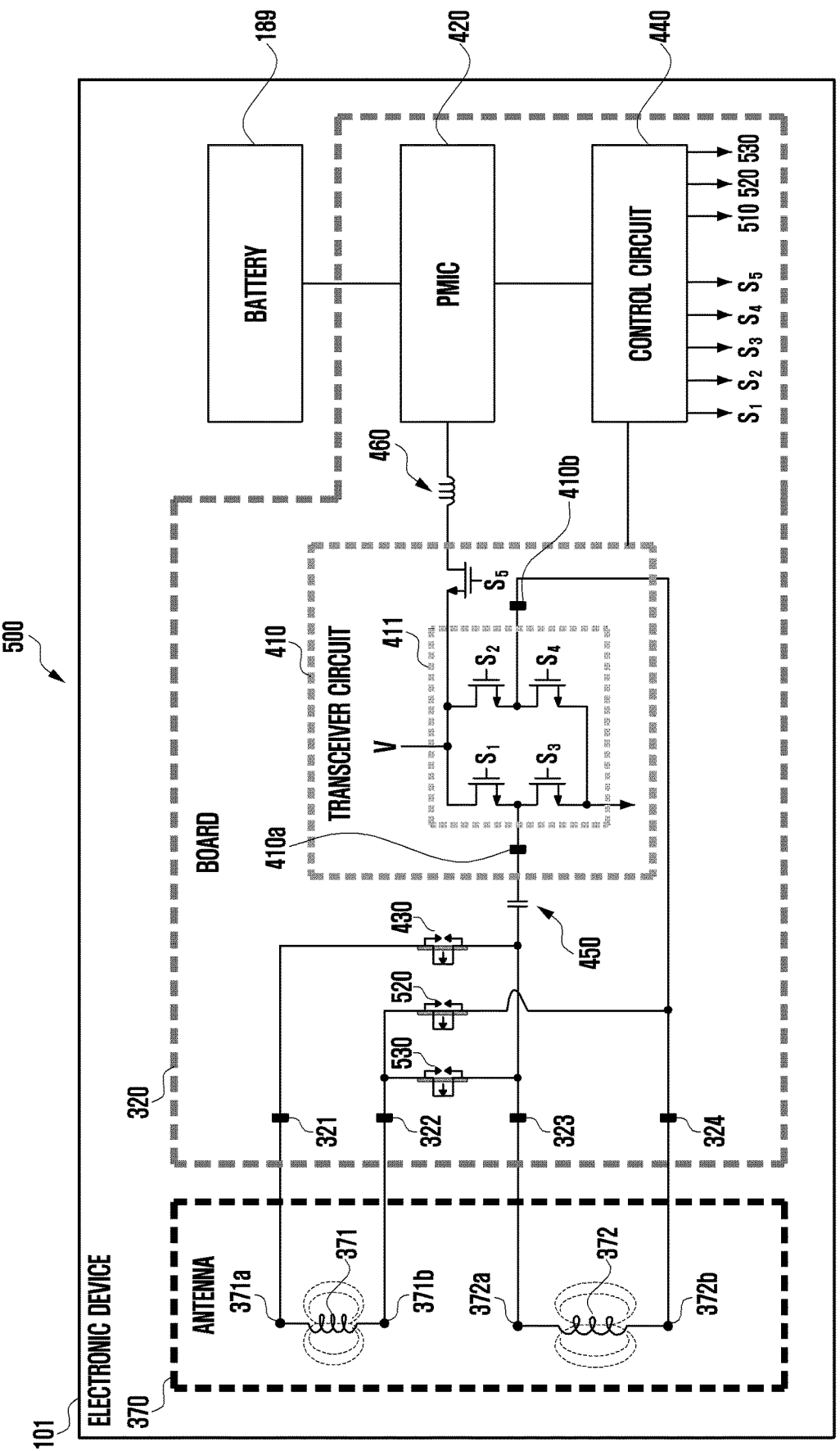
FIG. 5 is a block diagram of an electronic device configured to perform transmission/reception of a power signal and transmission of a payment signal using an antenna according to an embodiment of the disclosure.

FIG. 5 is a block diagram 500 of an electronic device 101 configured to perform transmission/reception of a power signal and transmission of a payment signal using an antenna 370 according to an embodiment of the disclosure. Referring to FIG. 5, an electronic device 101 may include a battery 189, a board 320, an antenna 370, a transceiver circuit 410, a PMIC 420, a control circuit 440, a first switch 430, a second switch 520, or a third switch 530. At least one of the transceiver circuit 410, the PMIC 420, the switches 430, 520, and 530, or the control circuit 440 may be mounted on the board 320. For convenience in explanation, constituent elements overlapping those of FIG. 4 will be omitted or will be simply described.

The transceiver circuit 410 may further include a switch S5. In a close state, S5 may electrically connect a full bridge circuit 411 to the PMIC 420. In an open state, S5 may block an electrical connection between the full bridge circuit 411 and the PMIC 420. According to an embodiment, in a power transmission mode or a power reception mode, S5 may be in a close state, and the transceiver circuit 410 may operate as a wireless charging circuit (e.g., wireless charging module 250 of FIG. 2). In case that the electronic device 101 is configured to transmit a payment signal (hereinafter, payment mode), S5 may be in an open state, and the transceiver circuit 410 may operate as the MST communication circuit (e.g., MST communication module 210 of FIG. 2).

In a payment mode, the transceiver circuit 410 may transmit a payment signal to an external electronic device (e.g., electronic device 102 of FIG. 1) through the antenna 370 by periodically changing the polarity of a voltage V being applied to two ends, that is, a first transceiver terminal 410*a* and a second transceiver terminal 410*b*. According to an embodiment, in case that the voltage V is applied to one end of S1 and one end of S2, and S5 is in an open state, the transceiver circuit 410 may transmit the payment signal to the external electronic device through the antenna 370 by periodically repeating a first transmission state and a second transmission state based on payment information (e.g., track information of a magnetic card). In various embodiments, the payment information may be stored in a memory 130 together with a payment application. When being executed by a processor (e.g., control circuit 440), the payment application may cause the processor to perform at least one of a user interaction operation (e.g., operation of displaying a screen for selecting a card (image) and acquiring payment information corresponding to the selected card from the memory 130), a user authentication procedure, and a control of the switches 430, 520, and 530 based on the user authentication.

In a close state, the first switch 430 may connect the first end 371*a* of the first coil 371 to the first transceiver terminal 410*a*. In an open state, the first switch 430 may block the connection between the first end 371*a* and the first transceiver terminal 410*a*.

In a close state, the second switch 520 may connect the second end 371*b* of the first coil 371 to the second transceiver terminal 410b. In an open state, the second switch 520 may block the connection between the second end 371b and the second transceiver terminal 410b.

In a close state, the third switch 520 may connect the second end 371b of the first coil 371 to the first end 372a of the second coil 372. In an open state, the third switch 530 may block the connection between the second end 371b and the first end 372a.

In a payment mode, the control circuit 440 may apply the voltage V to one end of S1 and one end of S2 of the transceiver circuit 410. Based on the payment information, the control circuit 440 may control the full bridge circuit 411 to periodically repeat the first transmission state and the second transmission state. Accordingly, the transceiver circuit 410 may transmit a signal including the payment information to the external electronic device through the antenna 370.

The control circuit 440 may control the switches 430, 520, and 530 based on the kind of the external electronic device to share the power. For example, based on the external electronic device being identified as the first external electronic device, the control circuit 440 may configure the first switch 430 in a close state, the second switch 520 in a close state, and the third switch 530 in an open state (hereinafter, the state of such switches 430, 520, and 530 is named "first power sharing state". Based on the external electronic device being identified as the second external electronic device, the control circuit 440 may configure all the switches 430, 520, and 530 in an open state (hereinafter, second power sharing state). As the switches 430, 520, and 530 are configured to be in the first power sharing state, the first coil 371 and the second coil 372 are connected in parallel to the transceiver circuit 410, and thus may be used as an antenna (e.g., wireless charging antenna 297-5 of FIG. 2) for the power sharing. As the switches 430, 520, and 530 are configured to be in the second power sharing state, only the second coil 372 is connected to the transceiver circuit 410, and may be used as the antenna for the power sharing.

Based on the user authentication for the payment, the control circuit 440 may configure the first switch 430 and the third switch 530 in a close state, and may configure the second switch 520 in an open state (hereinafter, payment state). For example, the control circuit 440 may receive user identification information (e.g., password, speech, fingerprint, iris, or face image) from an input device 150, a sensor module 176, or a camera module 180, perform an authentication procedure (e.g., determine whether pre-stored information and the received identification information coincide with each other) based on the received identification information, and configure the switches 430, 520, and 530 to be in a payment state based on the user authentication as the result of performing the authentication procedure. Further, the control circuit 440 may receive a message notifying that the user authentication has been made to other constituent elements (e.g., auxiliary processor specialized in a security function), and may configure the switches 430, 520, and 530 to be in a payment state in accordance with the message. As the switches 430, 520, and 530 are configured to be in the payment state, the first coil 371 and the second coil 372 may be connected in series to the transceiver circuit 410 and may be used as an antenna (e.g., MST antenna 297-1 of FIG. 2) for transmitting the payment signal.

According to an embodiment, the control circuit 440 may be implemented by the processor 120 of FIG. 1 (e.g., main processor 121 or auxiliary processor 123). According to an embodiment, the control circuit 440 is not limited to be in the location as described above with reference to FIG. 4, but may be a circuit built in the transceiver circuit 410, the PMIC 420, or the switch 430. According to an embodiment, the control circuit 440 may be connected to a separate processor, and may operate under the control of the processor. For example, the processor 120 (e.g., application processor) may be connected to the control circuit 440 through a general purpose input output (GPIO) terminal, and may control the operations of the inverter and the rectifier. The processor 120 may be connected to the control circuit 440 through another GPIO terminal, and may control the operation of transmitting the payment information.

FIGS. 6A, 6B, 6C, 6D, and 6E illustrate operation scenarios 610, 620, 630, 640, and 650 of an electronic device 101 according to various embodiments of the disclosure.

Figure 6A:
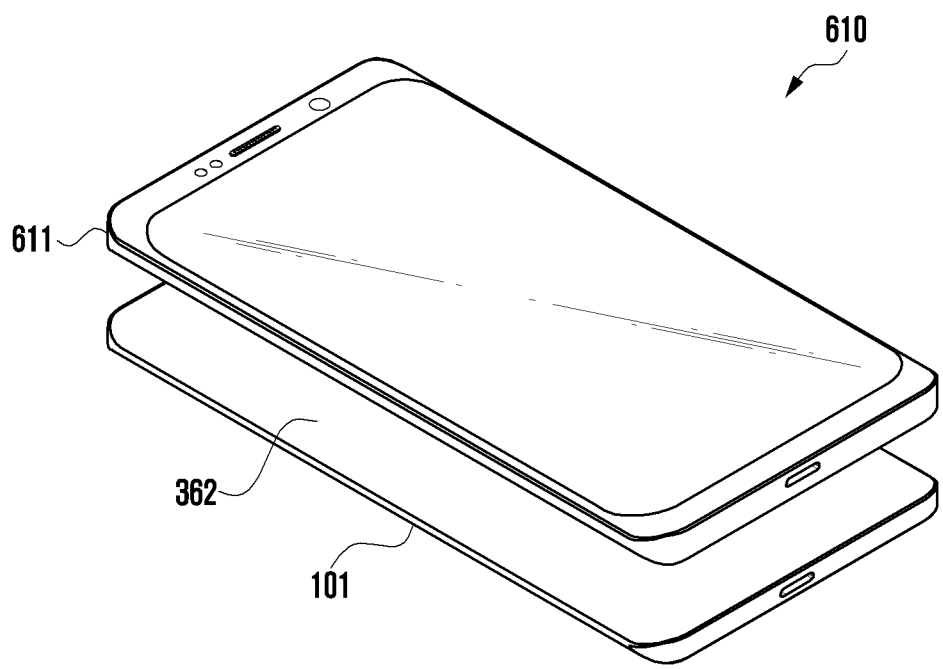
FIG. 6A illustrates an operation scenario of an electronic device according to an embodiment of the disclosure.
Figure 6B:
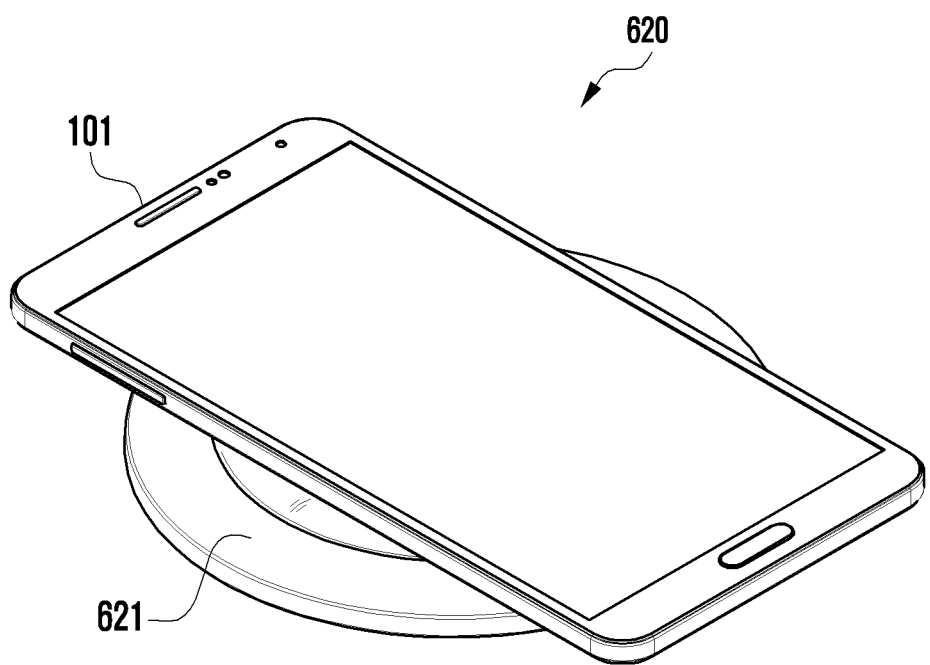
FIG. 6B illustrates an operation scenario of an electronic device according to an embodiment of the disclosure.

Referring to FIGS. 6A and 6B, a smart phone 611 may be located adjacent to a rear cover 262 of the electronic device 101, or the electronic device 101 may be put on a first wireless charging pad 621 so that the rear cover 262 faces the first wireless charging pad 621. The smart phone 611 and the first wireless charging pad 621 may transmit their identification information to the electronic device 101 using an inband or outband method. For example, during performing of an identification & configuration operation in a wireless charging procedure defined in the WPC standards between the smart phone 611 (or first wireless charging pad 621) and the electronic device 101, the smart phone 611 (or first wireless charging pad 621) may transmit the identification information to the electronic device 101 using the inband method. The control circuit 440 of the electronic device 101 may acquire the identification information through the antenna 370 or another antenna (e.g., NFC antenna 297-3 of FIG. 2). The electronic device 101 may recognize that the external electronic device is the smart phone 611 or the first wireless charging pad 621 (e.g., first external electronic device as described above) from the identification information. In an embodiment, the control circuit 440 may close the first switch 430 of FIG. 4 based on the external electronic device being recognized as the smart phone 611 or the first wireless charging pad 621. At the time of the identification, the first switch 430 has already been in a close state, and thus the control circuit 440 may maintain the state of the first switch 430 as it is. In another embodiment, the control circuit 440 may configure the switches 430, 520, and 530 of FIG. 5 to be in the first power sharing state. According to such embodiments, the coils 371 and 372 may be configured as a parallel circuit, and the electronic device 101 may share the power with the smart phone 611 using the coils 371 and 372, or may receive the power from the first wireless charging pad 621.

Figure 6C:
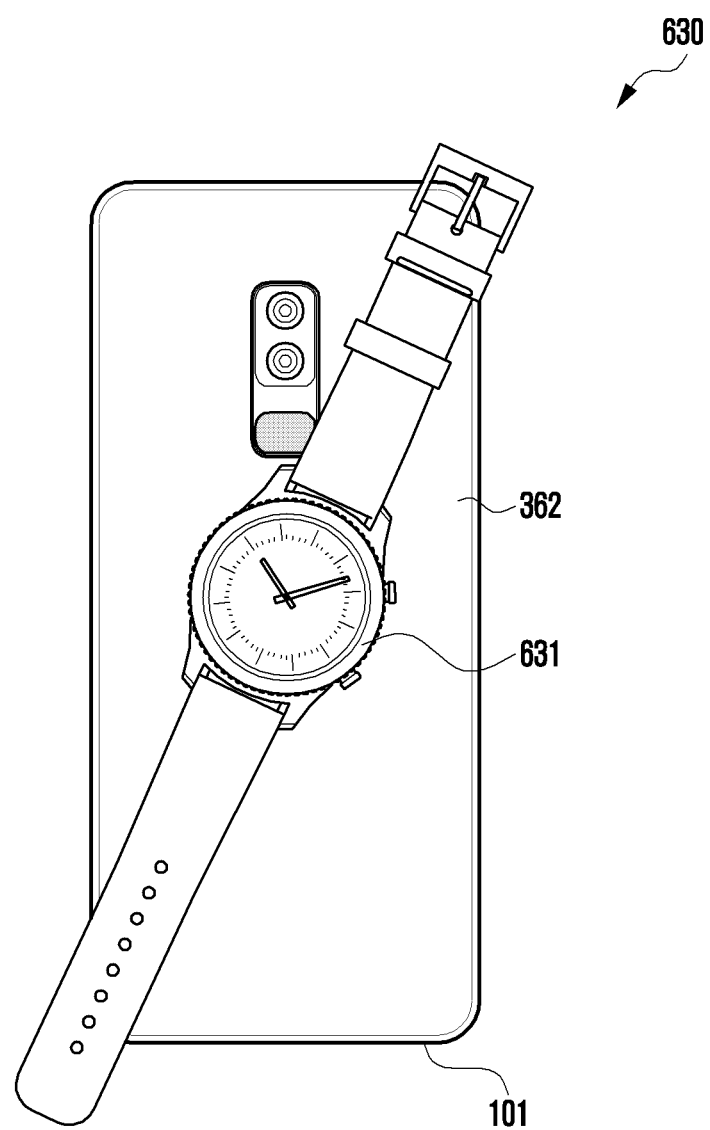
FIG. 6C illustrates an operation scenario of an electronic device according to an embodiment of the disclosure.
Figure 6D:
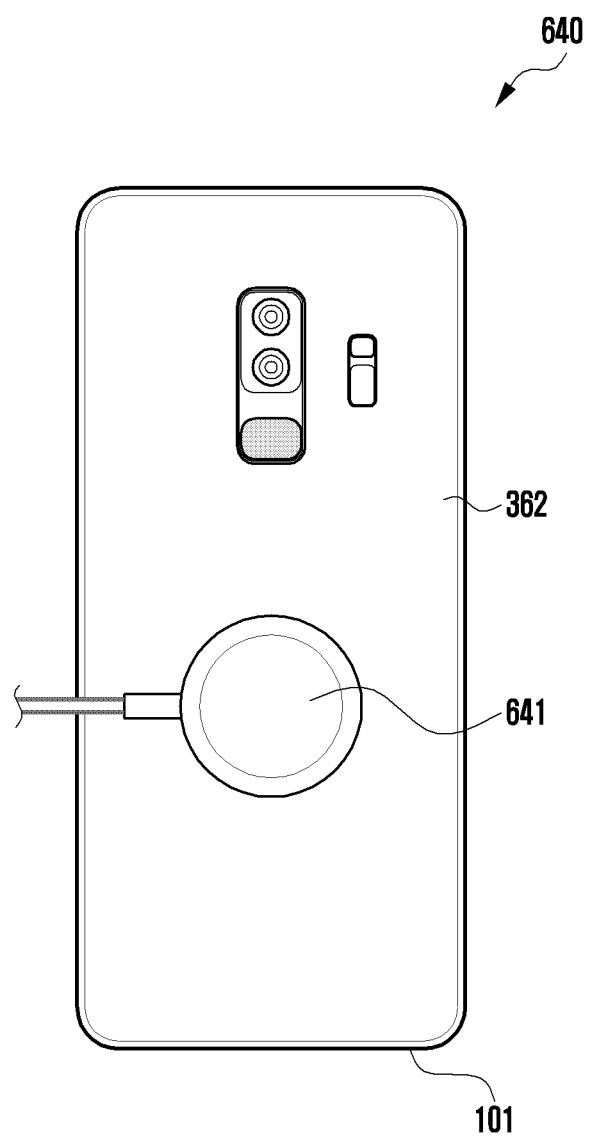
FIG. 6D illustrates an operation scenario of an electronic device according to an embodiment of the disclosure.

Referring to FIGS. 6C and 6D, an electronic watch 631 (or second type wireless charging pad 641 (e.g., wireless charging pad having a wireless charging coil having substantially the same outer diameter as the outer diameter of the second coil 372)) may be located adjacent to the second cover 362 (e.g., rear cover) of the electronic device 101. The electronic watch 631 and the second wireless charging pad 641 may transmit their identification information to the electronic device 101 using the inband or outband method. The control circuit 440 may recognize that the external electronic device is the electronic watch 631 or the second wireless charging pad 641 (e.g., second external electronic device as described above) from the identification information. In an embodiment, the control circuit 440 may open the first switch 430 of FIG. 4 based on the external electronic device being recognized as the electronic watch 631 or the second wireless charging pad 641. In another embodiment, the control circuit 440 may configure the switches 430, 520, and 530 of FIG. 5 to be in the second power sharing state. According to such embodiments, the electronic device 101 may share the power with the electronic watch 631 using the second coil 372, or may receive the power from the second wireless charging pad 641.

Figure 6E:
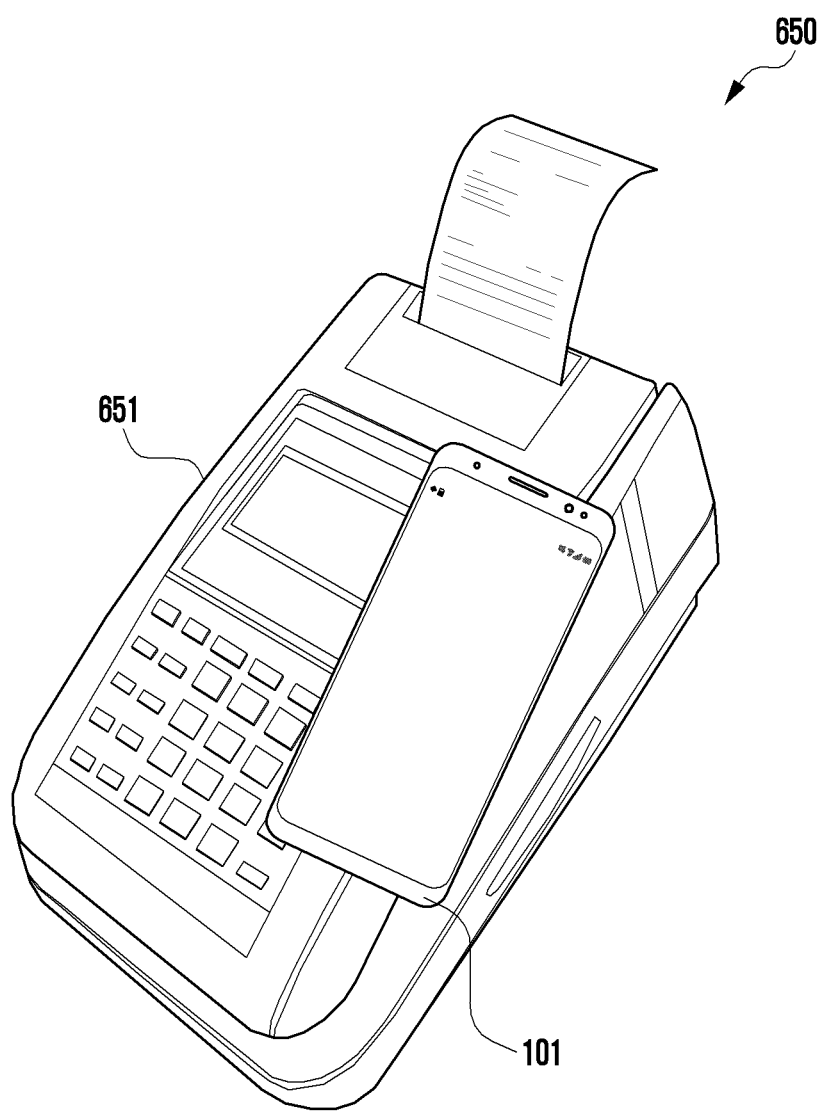
FIG. 6E illustrates an operation scenario of an electronic device according to an embodiment of the disclosure.

Referring to FIG. 6E, a user may perform an operation for payment with respect to a point of sales (POS) device 651 through a payment application being used in the electronic device 101. In this case, the control circuit 440 of the electronic device 101 may configure the switches 430, 520, and 530 of FIG. 5 to be in the payment state because the application being executed in the electronic device operates as the payment application, and the control circuit 440 should operate as the NFC or MST for the payment. Accordingly, the coils 371 and 372 may configure a series circuit, and the electronic device 101 may transmit the payment signal to the POS device 651 using the coils 371 and 372.

Figure 7:
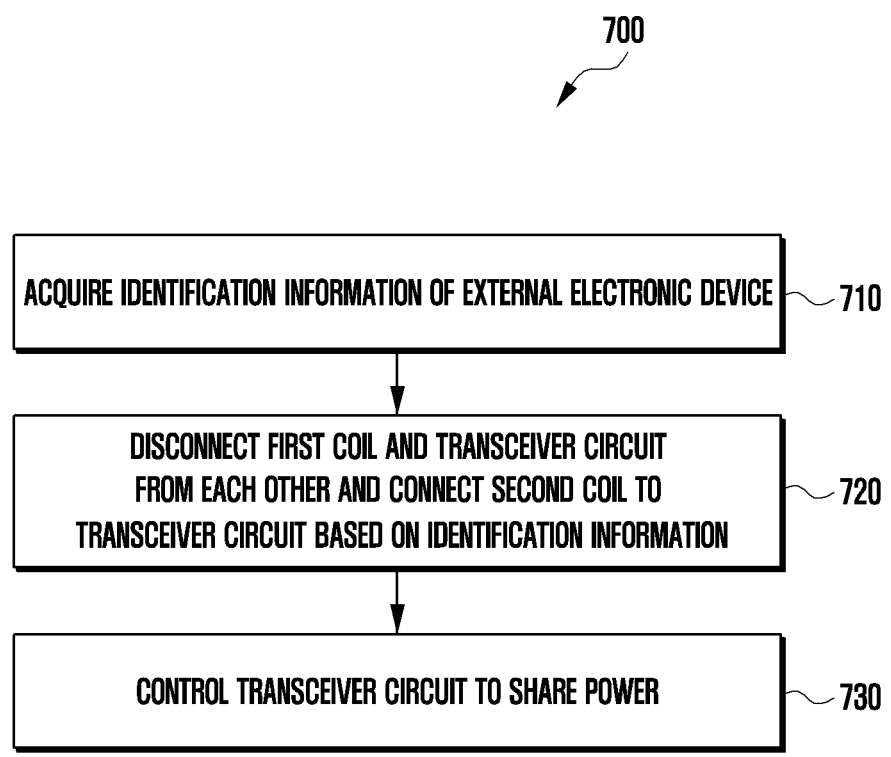
FIG. 7 is a diagram illustrating operations for selecting coils to support power sharing according to an embodiment of the disclosure.

FIG. 7 illustrates operations 700 for selecting coils to support power sharing according to an embodiment of the disclosure. Before performing the operations 700, the coils 371 and 372 may be configured as a parallel circuit.

Referring to FIG. 7, at operation 710, the control circuit 440 of the electronic device 101 may acquire the identification information of the external electronic device by performing data communication (e.g., inband or outband) with the external electronic device.

At operation 720, the control circuit 440 may disconnect the first coil 371 and the transceiver circuit 410 from each other, and may connect the second coil 372 to the transceiver circuit 410. For example, the identification information may include information on the kind (e.g., second external electronic device as described above) designated to be used by the second coil 372 only during the power sharing. Based on the identification information, the control circuit 440 may open the first switch 430 of FIG. 4. As another example, the control circuit 440 may configure the switches 430, 520, and 530 of FIG. 5 to be in the second power sharing state. According to an embodiment, an operation of acquiring the identification information in accordance with the configuration of the electronic device 101 and identifying the electronic device 101 may be performed by the processor 120. In accordance with the result of identification performed by the processor 120, the control circuit 440 may perform an operation 720 based on the respective identified external devices.

At operation 730, the control circuit 440 may control the transceiver circuit 410 to share (receive or transmit) the power. According to an embodiment, in the power transmission mode, the control circuit 440 may periodically repeat the first transmission state and the second transmission state as the state of the transceiver circuit 410 in accordance with the wireless charging standard (e.g., to match the designated frequency so as to be used for the wireless charging in the wireless power consortium (WPC) or alliance for wireless power (A4WP)). In the power reception mode, the control circuit 440 may maintain the transceiver circuit 410 in a reception state.

Figure 8:
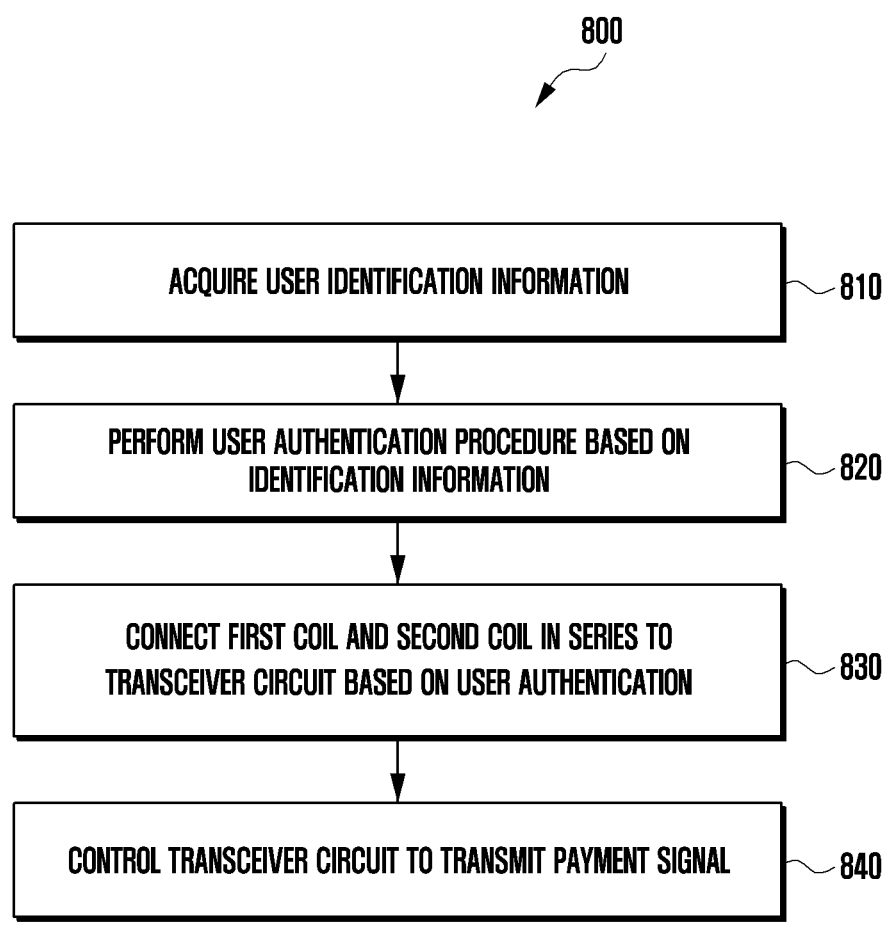
FIG. 8 is a diagram illustrating operations for configuring coils as an antenna for transmitting a payment signal according to an embodiment of the disclosure.

FIG. 8 is a diagram illustrating operations 800 for configuring coils as an antenna for transmitting a payment signal according to an embodiment of the disclosure. Before performing the operations 800, the coils 371 and 372 may be connected in parallel to the transceiver circuit 410, or only the second coil 372 may be connected to the transceiver circuit 410 configured as a parallel circuit. In addition, a payment application may be executed (e.g., information (e.g., card image) for identifying the selected card is displayed on the display 310).

Referring to FIG. 8, at operation 810, the processor 120 may acquire user identification information from an input device 150, a sensor module 176, or a camera module 180. According to an embodiment, the operation 810 may be performed by the control circuit 440.

At operation 820, the processor 120 may perform a user authentication procedure based on the acquired identification information. According to an embodiment of the disclosure, the operation 820 may be performed by the control circuit 440.

At operation 830, the control circuit 440 may connect the first coil 371 and the second coil 372 in series to the transceiver circuit 410 based on the user authentication as the result of performing the authentication procedure. For example, the control circuit 440 may configure the switches 430, 520, and 530 of FIG. 5 to be in the payment state.

At operation 840, the control circuit 440 may control the transceiver circuit 410 to transmit a payment signal. For example, referring to FIG. 5, the control circuit 440 may apply the voltage V to one end of S1 and one end of S2, and may open S5. In this state, the control circuit 440 may periodically repeat the first transmission state and the second transmission state as the state of the transceiver circuit 410 based on the payment information of the selected card.

In a certain embodiment, the operation 830 may be performed prior to the operation 810. For example, the control circuit 440 may connect the first coil 371 and the second coil 372 in series to the transceiver circuit 410 based on the information (e.g., card image) for identifying the selected card being displayed on the display 310. Thereafter, the control circuit 440 may perform the operations 810 and 820, and may perform operation 840 based on the user authentication having been performed.

According to various embodiments, an electronic device may include a power management circuit; an antenna including a first coil and a second coil; a transceiver circuit configured to transmit a power signal received from the power management circuit to the antenna and to transmit a power signal received from the antenna to the power management circuit; a first switch (e.g., first switch 430 of FIG. 4); and a control circuit electrically connected to the first switch and the transceiver circuit. A first end of the second coil may be connected to a first transceiver terminal of the transceiver circuit. A second end of the second coil may be connected to a second transceiver terminal of the transceiver circuit. A first end of the first coil may be connected to the first transceiver terminal through the first switch. A second end of the first coil may be connected to the second transceiver terminal. The control circuit may be configured to control the first switch based on identification information of an external electronic device received from the antenna through the transceiver circuit.

The electronic device may further include a housing including a first surface directed towards a first direction and a second surface directed towards a second direction being opposite to the first direction, the first coil and the second coil may be located inside the housing, and the second coil may be located inside the first coil as seen to face the second surface.

The first coil may have a first outer diameter and the second coil may have a second outer diameter, and the first coil and the second coil may be configured so that the total sum of inductances induced from the first coil and the second coil satisfies a designated condition in case that the first switch is in a close state.

The control circuit may be configured to change the state of the first switch to an open state (e.g., operation 720 of FIG. 7) based on a kind of the identified external electronic device indicating a product designated to use only the second coil in case that the first switch is in a close state.

The electronic device may further include a second switch (e.g., second switch 520 of FIG. 5) and a third switch (e.g., third switch 530 of FIG. 5), and the second end of the first coil may be connected to the second transceiver terminal through the second switch, the second end of the first coil may be connected to the first end of the second coil through the third switch, and the control circuit may be configured to open the second switch, to close the first switch and the third switch, and to transmit a payment signal (e.g., operations 830 and 840 of FIG. 8) to the antenna through the transceiver circuit based on a user authentication for payment.

The control circuit may be configured to change a state of the first switch and the second switch to an open state (e.g., operation 720 of FIG. 7) based on a kind of the identified external electronic device indicating a designated product in case that the third switch is in an open state and the first switch and the second switch are in a close state.

The electronic device may further include a fourth switch (e.g., switch S5 of FIG. 5) configured to connect the transceiver circuit to the power management circuit in a close state, and the control circuit may be configured to apply a voltage for generating the payment signal to the transceiver circuit, and to make the fourth switch in an open state in case that the payment signal is transmitted.

The payment signal may include a magnetic signal including payment information corresponding to track information of a magnetic card.

The control circuit may be configured to receive the power signal including the identification information through the transceiver circuit.

The electronic device may further include a short-range communication circuit, and the control circuit may be configured to receive the identification information through the short-range communication circuit.

The control circuit may include an application processor.

The control circuit may include a circuit built in the transceiver circuit.

The electronic device may further include a first cover directed towards a first direction and forming a first surface of the electronic device; a second cover directed towards a second direction being opposite to the first direction and forming a second surface of the electronic device; a display located closer to the first cover than the second cover; and an FPCB located closer to the second cover than the first cover and including the antenna, and the first coil may be spirally wound around an axis being substantially parallel to the second direction, and the second coil may be spirally wound around the axis.

The FPCB may be composed of a plurality of layers, and one part of the first coil may be wound on a first layer of the FPCB and another part of the first coil may be wound on a second layer of the FPCB, and one part of the second coil may be wound on the first layer and another end of the second coil may be wound on the second layer.

According to various embodiments, a method for operating an electronic device (e.g., operations 700 of FIG. 7) may include acquiring identification information of an external electronic device in a first state where a first coil and a second coil are connected in parallel to a transceiver circuit; connecting at least one of the first coil or the second coil to the transceiver circuit based on the identification information; and controlling the transceiver circuit to transmit a power signal to the external electronic device or to receive a power signal from the external electronic device in a second state where at least one of the first coil or the second coil is connected to the transceiver circuit.

Connecting only the second coil to the transceiver circuit may include disconnecting the first coil and the transceiver circuit from each other based on a kind of the identified external electronic device indicating a designated product in the first state.

The method may further include acquiring user identification information from an input device, a sensor, or a camera included in the electronic device; performing a user authentication procedure based on the user identification information; connecting the first coil and the second coil in series to the transceiver circuit based on the user authentication as a result of performing the authentication procedure; and controlling the transceiver circuit to transmit a payment signal in a third state where the first coil and the second coil are connected in series to the transceiver circuit.

According to various embodiments, an electronic device may include a power management circuit; an antenna including a first coil and a second coil; a transceiver circuit configured to transmit a power signal received from the power management circuit to the antenna and to transmit a power signal received from the antenna to the power management circuit; a switch; and a control circuit electrically connected to the switch and the transceiver circuit. A first end of the second coil may be connected to a first transceiver terminal of the transceiver circuit. A second end of the second coil may be connected to a second transceiver terminal of the transceiver circuit. A first end of the first coil may be connected to the first transceiver terminal. A second end of the first coil may be connected to the second transceiver terminal through the switch. The control circuit may be configured to open or close the switch based on identification information of an external electronic device received from the antenna through the transceiver circuit.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device comprising:
 a power management circuit;
 an antenna including a first coil and a second coil;
 a transceiver circuit configured to transmit a power signal received from the power management circuit to the antenna and to transmit a power signal received from the antenna to the power management circuit, the transceiver circuit including a first transceiver terminal and a second transceiver terminal;
 a first switch; and
 a control circuit electrically connected to the first switch and the transceiver circuit,
 wherein a first end of the second coil is connected to the first transceiver terminal,
 wherein a second end of the second coil is connected to the second transceiver terminal,
 wherein a first end of the first coil is connected to the first transceiver terminal through the first switch,
 wherein a second end of the first coil is connected to the second transceiver terminal, and
 wherein the control circuit is configured to control the first switch based on identification information of an external electronic device received from the antenna through the transceiver circuit.

2. The electronic device of claim 1, further comprising:
a housing including:
a first surface directed towards a first direction, and
a second surface directed towards a second direction being opposite to the first direction, the first coil and the second coil being located inside the housing,
wherein the second coil is located inside the first coil as seen to face the second surface.

3. The electronic device of claim 2,
wherein the first coil includes a first outer diameter,
wherein the second coil includes a second outer diameter, and
wherein the first coil and the second coil are configured so that a total sum of inductances induced from the first coil and the second coil satisfies a designated condition in case that the first switch is in a close state.

4. The electronic device of claim 1, wherein the control circuit is further configured to change a state of the first switch to an open state based on a kind of the identification information of the external electronic device indicating a product designated to use only the second coil in case that the first switch is in a close state.

5. The electronic device of claim 1, further comprising:
a second switch; and
a third switch,
wherein the second end of the first coil is connected to the second transceiver terminal through the second switch,
wherein the second end of the first coil is connected to the first end of the second coil through the third switch, and
wherein the control circuit is further configured to:
open the second switch,
close the first switch and the third switch, and
transmit a payment signal to the antenna through the transceiver circuit based on a user authentication for payment.

6. The electronic device of claim 5, wherein the control circuit is further configured to change a state of the first switch and the second switch to an open state based on a kind of the identification information of the external electronic device indicating a designated product in case that the third switch is in an open state and the first switch and the second switch are in a close state.

7. The electronic device of claim 5, further comprising:
a fourth switch configured to connect the transceiver circuit to the power management circuit in a close state,
wherein the control circuit is further configured to:
apply a voltage for generating the payment signal to the transceiver circuit, and
actuate the fourth switch to an open state in case that the payment signal is transmitted.

8. The electronic device of claim 5, wherein the payment signal comprises a magnetic signal including payment information corresponding to track information of a magnetic card.

9. The electronic device of claim 1, wherein the control circuit is further configured to receive the power signal including the identification information of the external electronic device through the transceiver circuit.

10. The electronic device of claim 1, further comprising:
a short-range communication circuit,
wherein the control circuit is further configured to receive the identification information of the external electronic device through the short-range communication circuit.

11. The electronic device of claim 1, wherein the control circuit comprises an application processor.

12. The electronic device of claim 1, wherein the control circuit comprises a circuit built in the transceiver circuit.

13. The electronic device of claim 1, further comprising:
a first cover directed towards a first direction and forming a first surface of the electronic device;
a second cover directed towards a second direction being opposite to the first direction and forming a second surface of the electronic device;
a display located closer to the first cover than the second cover; and
a flexible printed circuit board (FPCB) located closer to the second cover than the first cover and including the antenna,
wherein the first coil is spirally wound around an axis being substantially parallel to the second direction, and
wherein the second coil is spirally wound around the axis.

14. The electronic device of claim 13,
wherein the FPCB is composed of a plurality of layers,
wherein a first part of the first coil is wound on a first layer of the FPCB, and a second part of the first coil is wound on a second layer of the FPCB, and
wherein a first part of the second coil is wound on the first layer, and a second end of the second coil is wound on the second layer.

15. A method for operating an electronic device, the method comprising:
acquiring identification information of an external electronic device in a first state in which a first coil and a second coil are connected in parallel to a transceiver circuit;
connecting at least one of the first coil or the second coil to the transceiver circuit based on the identification information; and
controlling the transceiver circuit to:
transmit a power signal to the external electronic device, or
receive a power signal from the external electronic device in a second state in which at least one of the first coil or the second coil is connected to the transceiver circuit.

16. The method of claim 15, wherein the connecting of the at least one of the first coil or the second coil to the transceiver circuit comprises:
connecting only the second coil to the transceiver circuit, and
disconnecting the first coil and the transceiver circuit from each other based on a kind of the identification information of the external electronic device indicating a designated product in the first state.

17. The method of claim 15, further comprising:
acquiring user identification information from an input device, a sensor, or a camera included in the electronic device;
performing a user authentication procedure based on the user identification information;
connecting the first coil and the second coil in series to the transceiver circuit based on the user authentication as a result of performing the authentication procedure; and
controlling the transceiver circuit to transmit a payment signal in a third state where the first coil and the second coil are connected in series to the transceiver circuit.

18. The method of claim 17, wherein the payment signal comprises a magnetic signal including payment information corresponding to track information of a magnetic card.

19. An electronic device comprising:
a power management circuit;
an antenna including a first coil and a second coil;
a transceiver circuit configured to transmit a power signal received from the power management circuit to the antenna and to transmit a power signal received from the antenna to the power management circuit, the transceiver circuit including a first transceiver terminal and a second transceiver terminal;

a switch; and a control circuit electrically connected to the switch and the transceiver circuit, wherein a first end of the second coil is connected to the first transceiver terminal, wherein a second end of the second coil is connected to the second transceiver terminal, wherein a first end of the first coil is connected to the first transceiver terminal, wherein a second end of the first coil is connected to the second transceiver terminal through the switch, and wherein the control circuit is configured to open or close the switch based on identification information of an external electronic device received from the antenna through the transceiver circuit.

20. The electronic device of claim 19, further comprising:

a housing including:
- a first surface directed towards a first direction, and
- a second surface directed towards a second direction being opposite to the first direction, wherein the first coil and the second coil are located inside the housing, and wherein the second coil is located inside the first coil and facing the second surface.

* * * * *